United States Patent [19]

Lutz et al.

[11] Patent Number: 4,473,253

[45] Date of Patent: Sep. 25, 1984

[54] VEHICLE SUNROOF

[75] Inventors: Alfons Lutz, Emmering; Hans Jardin, Inning, both of Fed. Rep. of Germany

[73] Assignee: Webasto-Werk W. Baier GmbH & Co., Gauting, Fed. Rep. of Germany

[21] Appl. No.: 423,432

[22] Filed: Sep. 24, 1982

[30] Foreign Application Priority Data

Dec. 29, 1981 [DE] Fed. Rep. of Germany ....... 3151778

[51] Int. Cl.$^3$ .............................................. B60J 7/10
[52] U.S. Cl. ..................................... 296/222; 296/224
[58] Field of Search ......................... 296/222, 224, 223

[56] References Cited

U.S. PATENT DOCUMENTS

| | | | |
|---|---|---|---|
| 3,075,806 | 1/1963 | Gmeiner | 296/222 |
| 3,174,793 | 3/1965 | Nallinger | 296/224 |
| 3,610,682 | 10/1971 | Vermeulen | 296/224 |
| 4,183,577 | 1/1980 | Ohrle | 296/222 |

FOREIGN PATENT DOCUMENTS 1029691 10/1953 Fed. Rep. of Germany ...... 296/222

1238133 6/1960 France ................................. 296/222

Primary Examiner—Robert R. Song
Attorney, Agent, or Firm—Sixbey, Friedman & Leedom

[57] ABSTRACT

A vehicle sunroof with a cover closing a roof hatch, said cover being slidable rearward under the roof to open the roof hatch, and having two laterally directed, lengthwise displaceable brake rods, as well as two first guide parts running lengthwise of the vehicle along both sides of the cover. A roof frame extends rearward on both sides of the roof hatch, to which frame second guide parts, complementary to the first guide parts, are fastened, said parts meshing with the first guide parts and locating them in the vertical direction. In order to facilitate manufacture and installation of a vehicle sunroof of this type, provision is made for the roof frame to have a sloping surface on each side, opposite the ends of the brake rods in each intermediate open position, and an approximately horizontal support surface abutting said areas laterally and externally, for coacting with the brake rods despite variations in their lengthwise adjustment.

4 Claims, 5 Drawing Figures

VEHICLE SUNROOF

BACKGROUND AND SUMMARY OF THE INVENTION

The invention relates to a vehicle sunroof with a cover which closes a roof hatch and is slidable rearward beneath the roof surface to open the roof hatch, said cover comprising two laterally directed and lengthwise displaceable brake rods, as well as two first guide parts running in the lengthwise direction of the vehicle on both sides of the cover, and with a roof frame extending rearward on both sides of the roof hatch, to which frame second guide parts complementary to the first guide parts are fastened, said second guide parts meshing with the first guide parts and locating the latter in the vertical direction.

In a vehicle sunroof of the above type, as known from German Pat. No. 964,021, the brake rods serve, among other things, to lock the sunroof in any desired open position, whereby the brake rods are pressed against a vertical wall of the roof frame by actuating a locking mechanism, and the sunroof is locked by the pressure between the ends of the brake rods and the roof frame. When the cover of the sunroof is pulled completely into the roof hatch, the ends of the brake rods in the known sunroof are located opposite a sloping part. In addition, at least one of the guide parts is provided in this position with a recess, so that, when the brake rods are extended, the latter are guided along the slope of the sloping part and raise the sunroof in the vertical direction, until the trailing edge of the cover is flush with the rest of the roof, and the cover fits tightly in the roof hatch (see also German Pat. Nos. 1,063,472; 1,137,327; and 1,084,586).

In vehicle sunroofs according to the state of the art, there is the disadvantage that the brake rod must be set precisely relative to the width of the vehicle to permit the cover of the sunroof to be locked securely in any intermediate open position. Hence, manufacturing of the sunroof and especially its installation in the vehicle are time-consuming and costly.

On the basis of the state of the art, a principal object of the present invention is to provide a vehicle sunroof of the type recited hereinabove which is characterized by lower manufacturing and installation costs, and in which, in particular, precise lengthwise adjustment of the brake rods is not required.

This object is achieved, in accordance with a preferred embodiment, by virtue of the fact that the roof frame is provided on both sides with a sloping area which is opposite free ends of the brake rods in any intermediate open position, and an approximately horizontal supporting surface abutting the latter outwardly and laterally, for supporting the brake rods.

The means according to the invention has the following effect:

If the two brake rods are extended laterally in an intermediate open position, for example by actuating a locking mechanism, their ends run up on the sloping surface, whereby the brake rods, after being extended further, are lifted up on the approximately horizontal supporting surface. However, since the two guide parts, complementary to each other, are engaged in the intermediate open position, the cover is clamped between the lower edge of the brake rod end and the guide parts, thus providing a secure locking of the cover in every intermediate open position. The length of the brake rods is completely noncritical, since these rods rest upon the approximately horizontal support surfaces and the location of their end positions in the horizontal direction is unimportant. The fact that the means according to the invention no longer require the ends of the brake rods to be pressed against a vertical surface permits the frame part to be laterally made out of thinner material. This offers a possibility for menufacturing the entire frame to the same thickness of material.

According to an especially advantageous embodiment, the first guide parts are made of laterally directed guide shoes mounted on laterally directed sliding angles, while the second guide parts consist of guide tracks with two parallel, horizontal ribs, by which the guide shoes are surrounded at the top and bottom. The upper rib of the guide track is provided with a recess at the position which the guide shoe occupies when the sunroof is in the closed position, so that the connection between the guide shoes and the guide tracks is released in this position, permitting the cover to be raised to the point where it is flush with the remaining solid roof surface of the motor vehicle.

In order to increase the grip when the cover is locked in an intermediate open position, provision is made by another advantageous embodiment of the invention for the top surfaces of the guide shoes and/or the bottom surfaces of the upper rib of the guide tracks to be designed in such fashion that the friction between the two parts is increased in the locking state. Advantageously, sufficient play is provided between the guide track and the guide shoe in the non-locked state that the upper surfaces of the guide shoes and the lower surfaces of the upper ribs of the guide tracks do not come in contact, permitting a slight displacement of the cover.

It is particularly advantageous, according to another embodiment of the invention, for rollers, of a type that is known per se, to be disposed at the ends of the brake rods, the axes of said rollers being directed in the lengthwise direction of the vehicle, so that the brake rods can travel easily on the sloping surfaces and the horizontal support surfaces adjacent thereto.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

The terms "forward", "rear", "side", "up", and "down" are used in the following to relate to the vehicle as a whole in the usual sense.

Figure 1:
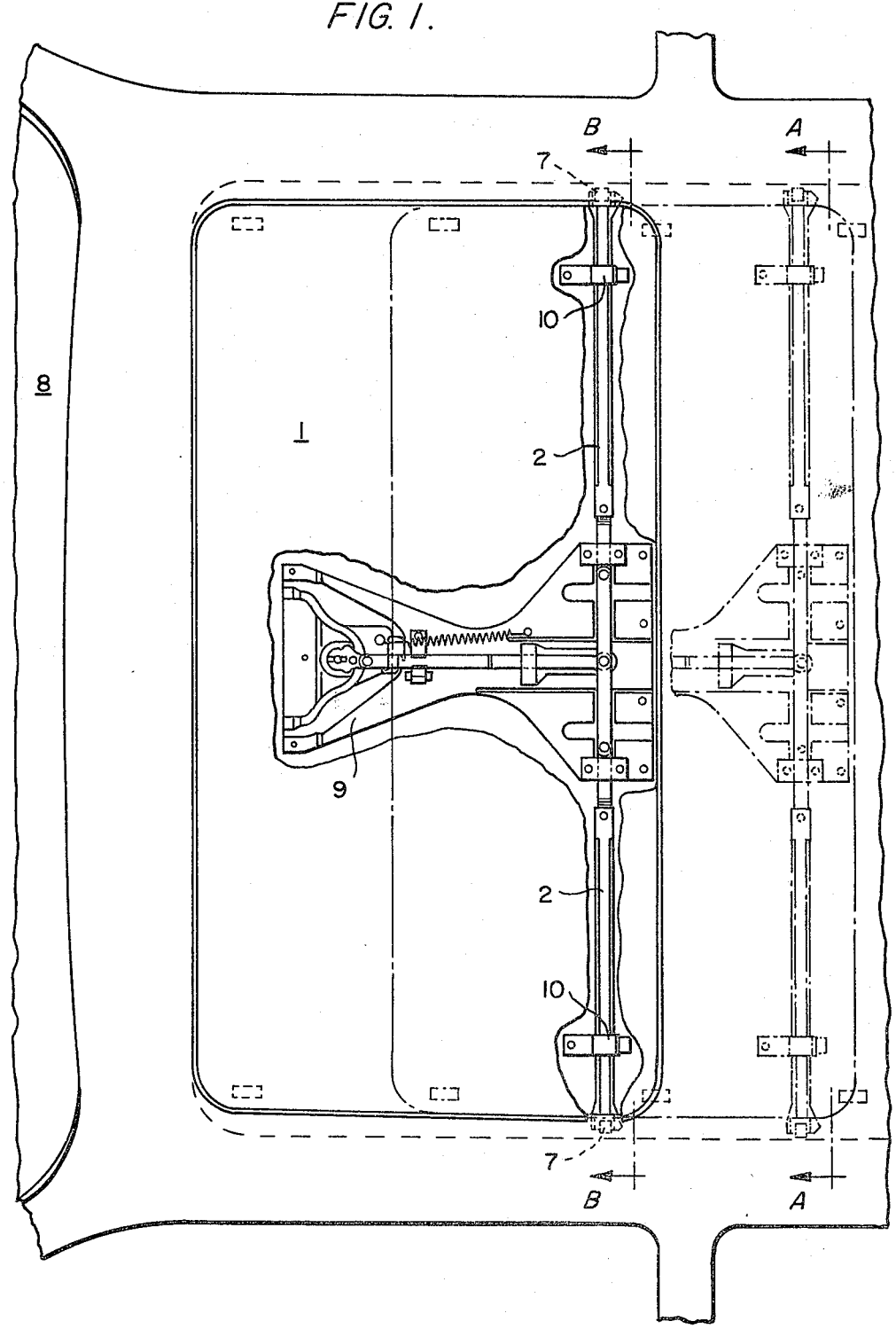
FIG. 1 is a vehicle roof according to the invention, shown in a top view.

In FIG. 1, the reference numeral 8 refers to the windshield of a motor vehicle. A sunroof with a rigid cover 1 can be seen. The position indicated by the solid lines shows the closed position of the cover, while the position indicated by the dot-dashed lines shows an intermediate open position of the cover. The locking mechanism of the cover is generally designated by numeral 9. The locking mechanism 9 is shown here as a system of toggle levers, similar to the arrangement known from German Pat. No. 964,021. Basically, however, other known embodiments can be used (i.e., German AS No. 1,580,603). Two brake rods 2 can be actuated by locking mechanism 9, said rods extending outward to both sides, starting at the center, in the vicinity of the trailing edge of the cover. Brake rods 2 are guided along cover 1 by guide bushings 10. The two free ends of brake rods 2 are each forked and each receives a roller 7, whose rotational axis is directed in the lengthwise direction of the vehicle.

Operation of the vehicle sunroof according to the invention is most apparent in FIGS. 2 to 5.

Figure 2:
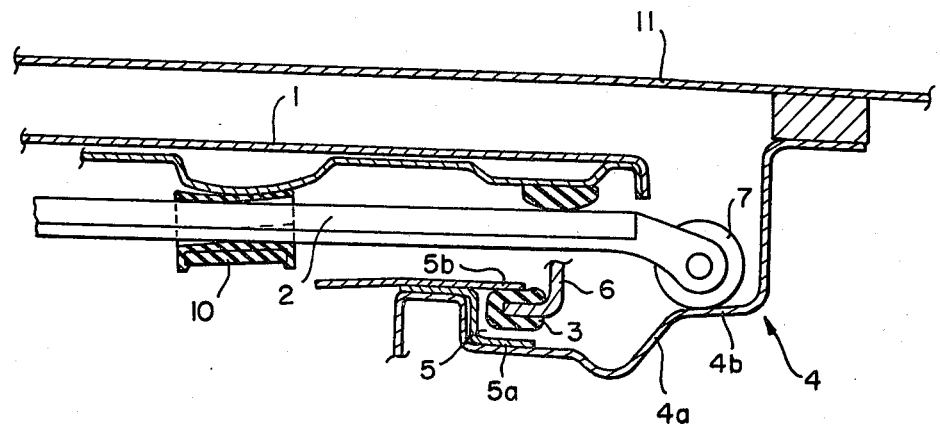
FIG. 2 is a section along the A—A in FIG. 1, where the vehicle roof is locked in an intermediate position.
Figure 3:
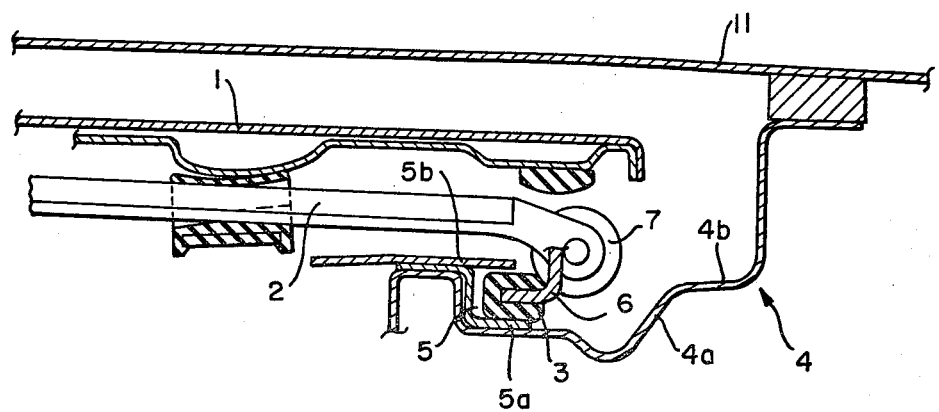
FIG. 3 is a section as in FIG. 2, but with the vehicle roof in the non-locked position.

FIGS. 2 and 3 show cover 1 partially slid back beneath the solid roof surface 11. Each brake rod 2 is fastened to the bottom of cover 1 by a respective guide bushing 10, said rod having a roller 7 at its end. In addition, a sliding angle 5 is fastened to the underside of the cover, said angle supporting a guide shoe 3, which is directed laterally inward. A frame 4, running in the lengthwise direction of the vehicle, is fastened to solid the roof surface 11. This frame supports a guide track 5 that has an upper rib 5b and lower rib 5a, between which the guide shoes 3, fastened to the cover, can move lengthwide. The complementary cooperation between guide shoe 3 and guide track 5 vertically holds the cover in its lowered intermediate open position. As FIG. 2 shows clearly, when the brake rod 2 is extended laterally (by actuating locking mechanism 9), its end projects beyond the lateral edge of cover 1, and roller 7 on the brake rod runs up on sloping surface 4a of roof frame 4 onto the approximately horizontal support surface 4b, whereby the roller 7 and the rod 2 are lifted upward, acting to force the cover 1 upward. However, since guide shoe 3 is located inside the guide track 5, it strikes the upper rib 5b of the guide track, whereby the cover is tensioned and reliably locked in its illustrated intermediate open position; the same occurs at the completely open position. The locking is further improved by virtue of the fact that means are disposed between the upper edge of guide shoe 3 and the lower edge of upper rib 5b which increases the friction between the two parts. For example, to increase the friction in the vicinity of the upper surfaces of guide shoes 3 and the lower surfaces of upper ribs 5b of guide tracks 5, the guide shoes can be made of a material with high adhesive friction, i.e., rubber, or can have a coating of such a material on their upper surfaces. Instead, or in addition, rib 5b can be provided on its underside with such a coating or with beads, slots, embossed areas, or rough areas of some other type (not shown). As is clearly apparent from FIG. 2, roller 7 of brake rod 2 does not strike the vertical wall of roof frame 4, so that the lengthwise adjustment of brake rod 2 is not critical within wide limits.

FIG. 3 shows a cross section as in FIG. 2, but with cover 1 unlocked. As is clearly apparent, brake rod 2 is retracted so that its roller 7 is located inside the lateral edge of cover 1. Cover 1 then rests on lower rib 5a by means of guide shoes 3. Advantageously, a coating is provided on the upper edge of lower rib 5a and/or the lower edge of guide shoe 3 to reduce the friction between the two parts, making cover 1 easily displaceable.

Figure 4:
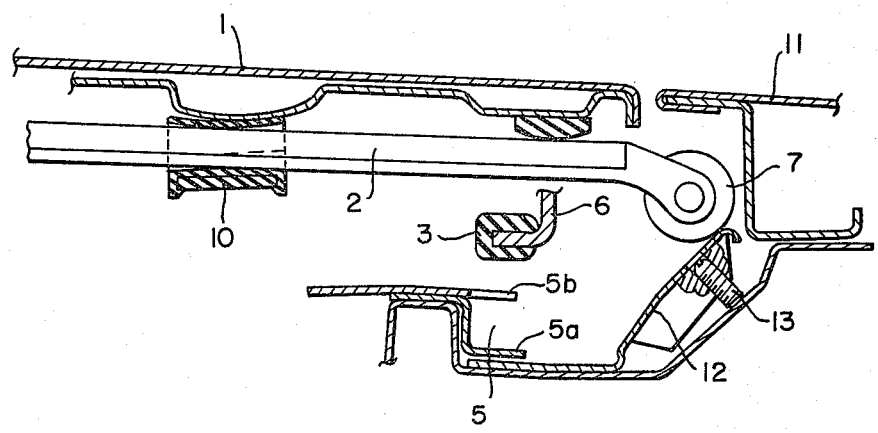
FIG. 4 is a section along line B—B in FIG. 1, wherein the vehicle sunroof is completely closed.

FIG. 4 shows the closed and locked cover 1, flush with the solid roof area 11. As is clearly evident, brake rod 2 has been extended beyond the lateral cover edge, so that its roller 2 has run up on a sloping part 12. The inclination of sloping part 12 is adjustable by a screw 13. In this closed position, guide shoe 3 is located opposite a recess or cut-out in upper rib 5b of guide track 5, so that the cover is no longer restrained in the vertical direction and can be lifted upward by the action of brake rod 2 running up on the sloping part, until the cover 1 is flush with roof 11.

Figure 5:
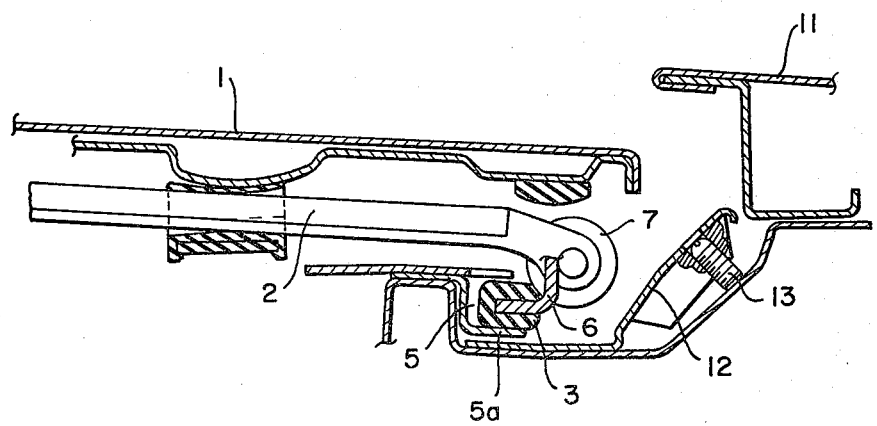
FIG. 5 is a section as in FIG. 4, wherein the cover is located completely in the roof hatch, but the locking mechanism is released.

FIG. 5 shows the same section as FIG. 4, but with brake rods 2 retracted, so that their ends with rollers 7 are located below the edge of cover 1. Roller 7 has slid down along supporting element 12 during the transition from the position shown in FIG. 4 to the position shown in FIG. 5, whereby the trailing edge of cover 1 has been lowered under the influence of gravity, until the lower edge of guide shoe 3 rests on lower rib 5a. In this position, cover 1 can be slid rearward beneath roof 11.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Vehicle sunroof comprising a cover for closing a hatch in a vehicle roof in a first position thereof and said cover being displaceable rearward beneath the roof to open the roof hatch in a second position thereof, said cover being provided with two laterally directed brake rods, as well as two first guide parts on both sides of the cover, and a roof frame extending longitudinally on both sides of the roof hatch, to which frame two second guide parts, that are complementary to the first guide parts, are fastened, said second guide parts engaging said first guide parts for restraining the latter in a vertical direction, wherein the roof frame is provided, on both sides, with a sloping surface which is located opposite free ends of the brake rods in each intermediate open position between said first and second positions, and an approximately horizontal support surface for said brake rods which extends laterally outwardly from adjacent each sloping surface, and wherein each brake rod is arranged for being lengthwise displaceable between an inward, unlocking position, whereat the free ends of the brake rods are at a height below that of said horizontal support surface, and an outward, locking position, whereat said free ends are raised onto said horizontal support surface so as to exert a force which causes the first guide parts to be urged against the restraining action of said second guide parts.

2. Vehicle sunroof according to claim 1, wherein the first guide parts comprise laterally directed guide shoes fastened to sliding angles, and the second guide parts comprise guide tracks having two spaced parallel horizontal ribs between which said guide shoes are disposed.

3. Vehicle roof according to claim 2, wherein at least one of the upper surfaces of the guide shoes and undersides of the upper ribs of said guide tracks are provided with a friction increasing means.

4. Vehicle sunroof according to one of claims 1 to 3, wherein rollers are rotationally mounted at the free ends of the brake rods so as to have axes of rotation directed lengthwise of the vehicle.

* * * * *